United States Patent
Alrabady et al.

(10) Patent No.: US 9,047,602 B2
(45) Date of Patent: Jun. 2, 2015

(54) IN-VEHICLE MOBILE TRANSACTIONS

(75) Inventors: Ansaf I. Alrabady, Livonia, MI (US); Fred W. Huntzicker, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 105 days.

(21) Appl. No.: 13/491,836

(22) Filed: Jun. 8, 2012

(65) Prior Publication Data

US 2013/0329888 A1    Dec. 12, 2013

(51) Int. Cl.
*G06F 21/00* (2013.01)
*G06Q 20/38* (2012.01)

(52) U.S. Cl.
CPC .......... *G06Q 20/38* (2013.01); *G06Q 20/38215* (2013.01)

(58) Field of Classification Search
CPC   G06Q 20/38; G06Q 20/38215; H04W 48/08; H04W 4/02
USPC ............ 380/270; 705/40, 67; 704/9; 340/5.2; 455/407
See application file for complete search history.

(56) References Cited

U.S. PATENT DOCUMENTS

| | | | | |
|---|---|---|---|---|
| 5,884,249 | A * | 3/1999 | Namba et al. | 704/9 |
| 2005/0159184 | A1* | 7/2005 | Kerner et al. | 455/558 |
| 2005/0187873 | A1* | 8/2005 | Labrou et al. | 705/40 |
| 2006/0020559 | A1* | 1/2006 | Steinmetz | 705/67 |
| 2009/0068982 | A1* | 3/2009 | Chen et al. | 455/407 |
| 2009/0070691 | A1* | 3/2009 | Jain | 715/760 |
| 2010/0109835 | A1* | 5/2010 | Alrabady et al. | 340/5.2 |
| 2011/0202466 | A1* | 8/2011 | Carter | 705/67 |

* cited by examiner

*Primary Examiner* — Syed Zaidi
(74) *Attorney, Agent, or Firm* — Cantor Colburn LLP

(57) ABSTRACT

A mobile client system initiates a wireless communication with a transaction system and receives a digital certificate from the transaction system in response. The digital certificate includes an embedded geographic location of the transaction system. The mobile client system also compares the geographic location of the transaction system with a current geographic location of the mobile client system and establishes an encrypted communication channel with the transaction system upon determining that the location of the transaction system is in proximity of the current location of the mobile client system. The mobile client system further sends the user credentials to the transaction system via the encrypted communication channel. Upon successful authentication of the mobile client system via the user credentials, the mobile client system performs a transaction with the transaction system using a graphical user interface of the client system.

20 Claims, 3 Drawing Sheets

IN-VEHICLE MOBILE TRANSACTIONS

FIELD OF THE INVENTION

The subject invention relates to electronic transactions and, more particularly, to performing in-vehicle mobile transactions.

BACKGROUND

Today's consumers are continuously seeking new ways to save time in their busy schedules, as evidenced, for example, by the increase in the number of drive-up restaurants, pharmacies, and vehicle toll collection services. While the consumers enjoy the benefits of not having to leave the vehicle, there are certain disadvantages to these types of transactions. For example, drive-up transactions often involve the physical exchange of a financial instrument, such as a debit card or a credit card in addition to a series of button selections on an interface of the transaction system, which temporarily exposes the user to elements of the weather. In addition, some transactions may be mechanically difficult based on the user's vehicle size or height in relation to the configuration of the transaction system interface, thereby causing the user to leave the vehicle in order to conduct the transaction. These issues can cause discomfort and inconvenience to the user. Furthermore, such open transactions, if containing personal or confidential information, may be subject to view by unknown persons.

Accordingly, it is desirable to provide a way for performing secure transactions within a vehicle with minimal physical or manual interaction between the user and the transaction system.

SUMMARY OF THE INVENTION

In one exemplary embodiment of the invention, a mobile client system for performing mobile transactions is provided. The mobile client system includes a computer processor and logic executable by the computer processor. The logic is configured to implement a method. The method includes initiating a wireless communication with a transaction system and receiving a digital certificate from the transaction system responsive to initiating the wireless communication. The digital certificate includes an embedded geographic location of the transaction system. The method also includes determining a current geographic location of the mobile client system, comparing the geographic location of the transaction system with the current geographic location of the mobile client system, and establishing an encrypted communication channel with the transaction system when, in response to the comparing, it is determined that the location of the transaction system is in proximity of the current location of the mobile client system. The method further includes sending user credentials to the transaction system via the encrypted communication channel. Upon successful authentication of the mobile client system via the user credentials, the method includes performing a transaction with the transaction system using a graphical user interface of the client system.

In another exemplary embodiment of the invention, a method for performing mobile transactions is provided. The method includes initiating a wireless communication with a transaction system and receiving a digital certificate from the transaction system responsive to initiating the wireless communication. The digital certificate includes an embedded geographic location of the transaction system. The method also includes determining a current geographic location of a mobile client system, comparing the geographic location of the transaction system with the current geographic location of the mobile client system, and establishing an encrypted communication channel with the transaction system when, in response to the comparing, it is determined that the location of the transaction system is in proximity of the current location of the mobile client system. The method further includes sending user credentials to the transaction system via the encrypted communication channel. Upon successful authentication of the mobile client system via the user credentials, the method includes performing a transaction with the transaction system using a graphical user interface of the client system.

In yet another exemplary embodiment of the invention, a computer program product for performing mobile transactions is provided. The computer program product includes a computer-readable storage medium having instructions embodied thereon, which when executed by a mobile client system, causes the mobile client system to implement a method. The method includes initiating a wireless communication with a transaction system and receiving a digital certificate from the transaction system responsive to initiating the wireless communication. The digital certificate includes an embedded geographic location of the transaction system. The method also includes determining a current geographic location of the mobile client system, comparing the geographic location of the transaction system with the current geographic location of the mobile client system, and establishing an encrypted communication channel with the transaction system when, in response to the comparing, it is determined that the location of the transaction system is in proximity of the current location of the mobile client system. The method further includes sending user credentials to the transaction system via the encrypted communication channel. Upon successful authentication of the mobile client system via the user credentials, the method includes performing a transaction with the transaction system using a graphical user interface of the client system.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
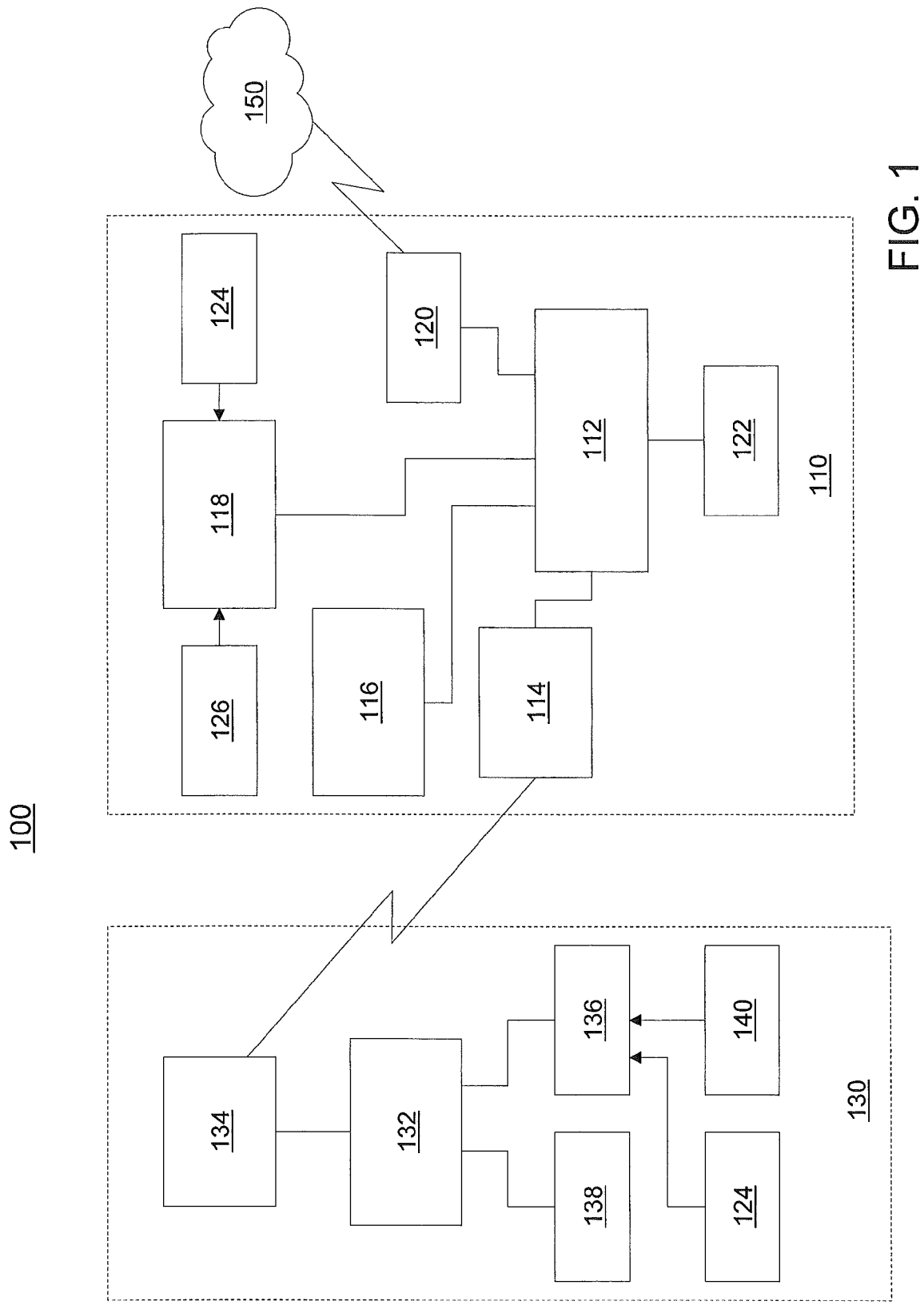
FIG. 1 is a block diagram of a system upon which mobile transaction services may be implemented in accordance with an embodiment of the invention.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, mobile transaction services are provided. The mobile transaction services enable an end user to conduct wireless, secure in-vehicle electronic transactions at a transaction system that is geographically located in proximity of the end user. The mobile transaction service establishes a secure communication channel between the vehicle, or mobile device in the vehicle, and a transaction system using short-range, wireless communications protocols and provides a graphical user interface that allows the end user to enter transaction data in the privacy of the vehicle.

Turning now to FIG. 1, a system 100 upon which mobile transaction services may be implemented will now be described. The system 100 includes a mobile client system 110 and a transaction system 130. The mobile client system 110 may be implemented within a vehicle using vehicle-integrated components, as will be described herein. Alternatively, the mobile client system 110 may be any portable or hand-held computer-enabled communications device, such as a smart phone, a personal digital assistant, and a tablet personal computer, to name a few. The mobile client system 110 may be operated by an end user of the mobile transaction services described herein.

The mobile client system 110 includes a controller 112 communicatively coupled to a wireless communications interface 114, input/output (I/O) components 116, a storage device 118, and a global positioning system (GPS) 120 over a communications network. If the mobile client system 110 is integrated in a vehicle, the controller 112 may be a central control system of the vehicle, e.g., including a computer processor and related circuitry that is communicatively coupled to various electronic components of the vehicle via physical wiring or a wireless local area network (LAN) in order to manage and control the operation of the vehicle. Alternatively, the controller 112 may be a computer processor contained with a hand-held communications device, such as a smart phone, personal digital assistant, or tablet PC.

The wireless communications interface 114 may include short-range, wireless communications components (e.g., transceivers) that utilize short-range wireless communication technologies to communicate with the transaction system 130, as will be described further herein. In an embodiment, the short-range wireless communications technologies may include near field communications (NFC) standards, Wi-Fi, Bluetooth™ low energy, or a combination thereof.

The I/O components 116 may include any input elements for enabling an end user to input information that is accessible to the controller 112. For example, the input components 116 may include a touch screen of a display unit, physical buttons on a console of a vehicle or on a front surface of a portable communications device, and one or more microphones for processing audio input from the end user. Output components may include a display unit and speakers disposed in the vehicle or portable device implementing the mobile client system 110.

The storage device 118 includes volatile and non-volatile memory of the mobile client system 110. The storage device 118 may optionally store one or more graphical user interfaces (GUIs) 124 of corresponding transaction systems (also referred to herein as "transaction system interface"), such as the transaction system 130. The GUIs 124 may be implemented as application code and data that is used to guide an end user through an authentication process as well as implementing one or more transactions. Alternatively, the GUIs 124 may be stored on the respective transaction systems 130 and transmitted to the mobile client system 110 during implementation of the mobile transaction services, as will be described further herein. In addition, the storage device 118 may optionally store financial or user account information 126 in a secure digital file or certificate. For example, the financial account information may include an identifier of a financial institution and an account number assigned to the end user. Alternatively, this account information may be provided at the time of the transaction by the end user who inputs a credit or debit card into the transaction system 130, which then reads the account information.

The GPS 120 of the mobile client system 110 provides location information to the controller 112 regarding a current geographic location of the mobile client system 110 based on its movement from one place to another. In one embodiment, the GPS 120 communicates over a network 150 to ascertain its location. In an alternate embodiment, the GPS 120 utilizes deduced reckoning (also known as "dead reckoning") to calculate the location. In this embodiment, the network 150 is not needed.

The controller 112 executes logic 122 for implementing at least a portion of the exemplary mobile transaction services described herein. The logic 122 is configured to identify a nearby transaction system, establish a secure communication channel with the transaction system, and execute one or more transactions over the secure communication channel, as will be described herein.

The transaction system 130 may be an automated teller machine (ATM), a take-out or drive-through business establishment (e.g., a restaurant or pharmacy), a parking garage, or any entity that conducts secure transactions with a mobile consumer or public base. The transaction system 130 includes computer hardware and related circuitry for assisting in the mobile transaction services. As shown in FIG. 1, the transaction system 130 includes a central processing unit (CPU) 132, a wireless communications interface 134, and a storage device 136.

Similar to the wireless communications interface 114 in the mobile client system 110, the wireless communications interface 134 may include short-range, wireless communications components (e.g., transceivers) that utilize short-range wireless communication technologies to communicate with mobile client systems, such as the mobile client system 110, as will be described further herein. In an embodiment, the short-range wireless communications technologies may include near field communications (NFC) standards, Wi-Fi, Bluetooth™ low energy, or a combination thereof.

The storage device 136 includes volatile and non-volatile memory. In one embodiment, the storage device 136 stores a graphical user interface (GUI) 124 configured for facilitating electronic transactions. The GUI may be implemented as application code and data that is used to guide an end user through an authentication process as well as implementing one or more transactions. In this embodiment, the GUI 124 is transmitted to a mobile client system 110 during an electronic transaction process, as will be described further herein. Alternatively, the GUI 124 may be stored on the mobile client system 110 in the storage device 118 and accessed by the controller 112 during a transaction. A sample display screen 304 of a GUI 124 is shown and described in FIG. 3. In addition, the storage device 136 may store financial or user account information for each of its customers. For example, the financial account information may include an identifier of the transaction system 130 or the financial institution to which it is affiliated, and an account number assigned to the end user.

In an embodiment, the storage device 136 also stores a transaction system digital certificate or file 140 that has cryptographic integrity protection and is transmitted to a mobile client system 110, as will be described further herein. A geographic location may be embedded on the digital certificate 140 for use in facilitating the creation of an encrypted channel between the transaction system 130 and the mobile client system 110, as will be described herein. In a further embodiment, the storage device 136 stores a local map (not shown) of the geographic location of the transaction system 130 and transmits the local map wirelessly to the mobile client system 110 as described herein.

The CPU 132 executes logic 138 for performing electronic transactions based on the business objectives of the transaction system 130 (e.g., banking functions, purchases of goods or services, etc.). The logic 138 is also configured to facilitate the discovery and creation of the encrypted channel based on information received from the mobile client system 110 via the respective wireless communications interfaces 114 and 134.

As indicated above, the mobile transaction services enable an end user to conduct wireless, secure in-vehicle electronic transactions at a transaction system that is geographically located in proximity of the end user. The mobile transaction services establish a secure communication channel between the vehicle (or portable communications device in the vehicle) and a transaction system, and provides a graphical user interface 124 that allows the end user to enter transaction data in the privacy of the vehicle.

Figure 2:
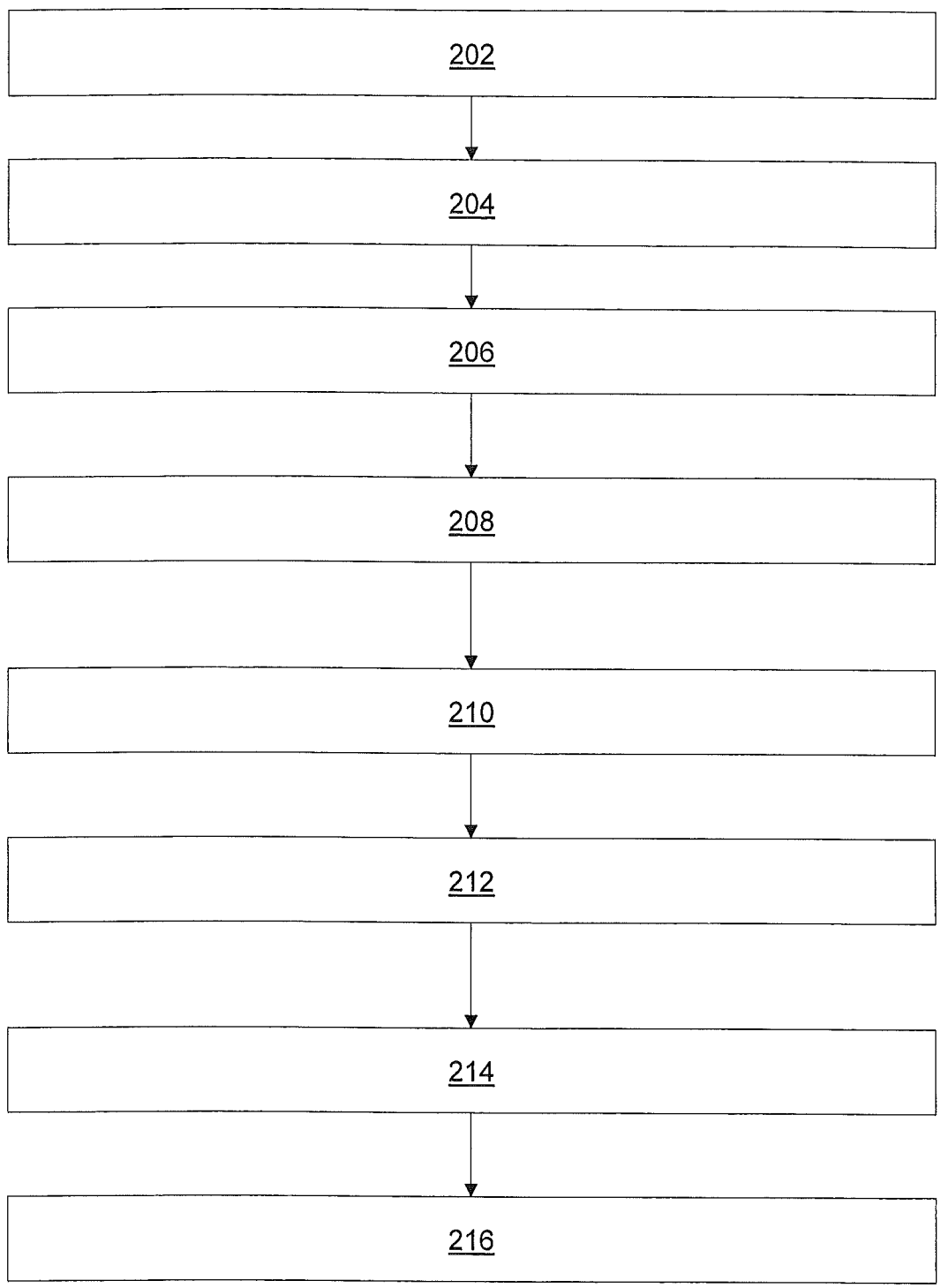
FIG. 2 is a flow diagram of a process for implementing mobile transaction services in accordance with an embodiment of the invention.

Turning now to FIG. 2, a process for implementing mobile transaction services will now be described in an embodiment. The process of FIG. 2 assumes that the mobile client system 110 has approached the transaction system 130 in order to conduct a transaction.

At step 202, the logic 122 of the mobile client system 110 initiates a communication with the transaction system 130 via its controller 112 and corresponding wireless communications interface 114. This may be an automatic function of the wireless communications interface 114 (e.g., the interface 114 periodically broadcasts a presence signal or a beacon signal) or may be manually initiated by an option (not shown) selected by the end user via the mobile client system 110. Alternatively, the communication may be initiated when an end user of the mobile client system 110 manually inputs a debit or credit card into a corresponding input component of the transaction system 130, which in turn, reads the account information from the card. The account information uniquely identifies an account of the end user. In this embodiment, the wireless communications interface 134 of the transaction system 130 enables its discovery by the mobile client system 110. The transaction system 130, in turn, broadcasts its identification to the mobile client system 110 via its wireless communications interface 134.

Figure 3:
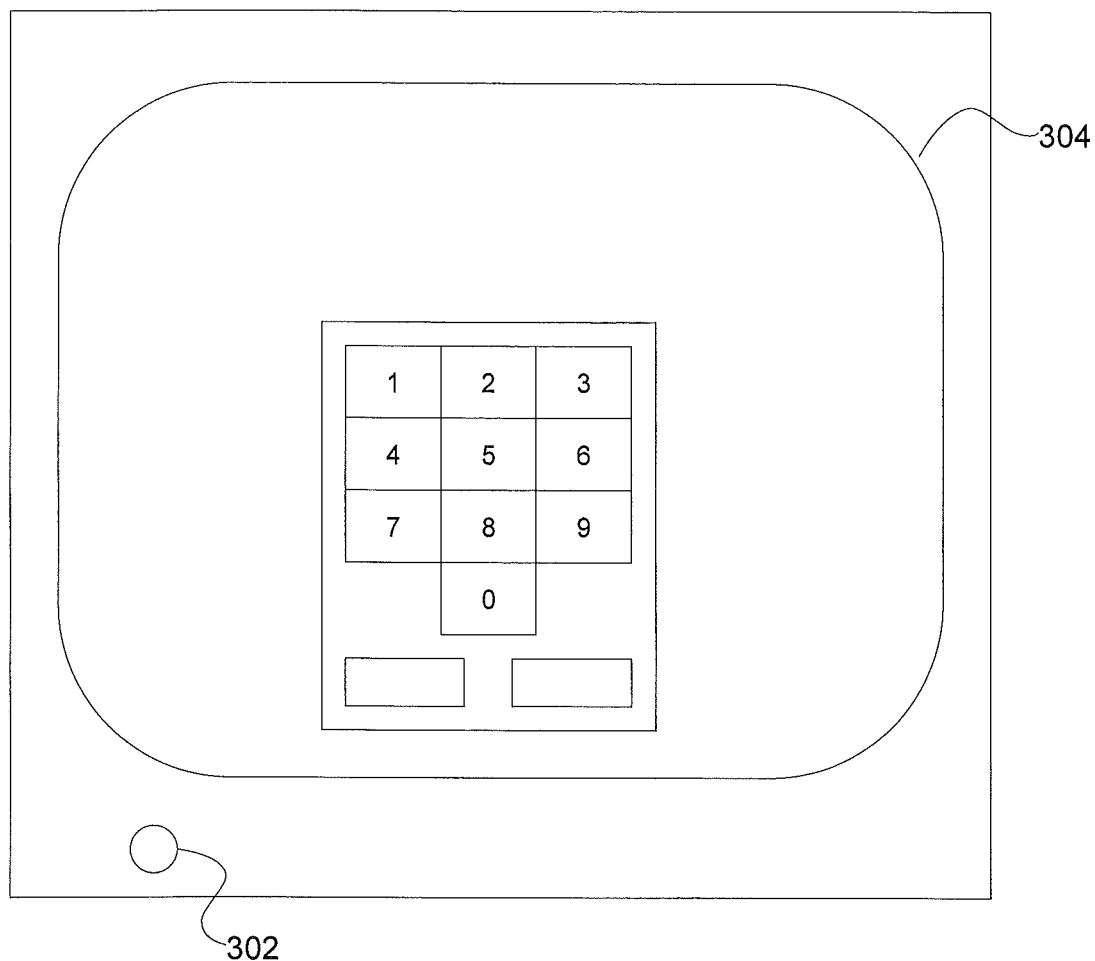
FIG. 3 is a user interface screen of a mobile client system in accordance with an embodiment of the invention.

The end user selects a designated option on the mobile client system 110 to accept a communication channel between the mobile client system 110 and the transaction system 130 in response to receiving the transaction system 130 identification at step 204. The designated option corresponds to one of the I/O components 116 of the mobile client system 110. As shown in FIG. 3, a mobile client system 300, which corresponds to the mobile client system 110, includes a button 302, which upon selection, causes the logic 122 to create a secure (e.g., encrypted) communication channel between the transaction system 130 and the mobile client system 110 via the respective wireless communications interfaces 114 and 134 at step 206.

The secure communication channel may be implemented in a variety of ways. In one embodiment, the transaction system 130 transmits a digital certificate 140 with the embedded geographic location of the transaction system 130 to the mobile client system 110, which is validated for authenticity. Once the digital certificate 140 is successfully authenticated, the logic 122 then determines the current geographic location of the mobile client system 110 using the GPS 120. The logic 122 compares the geographic location of the transaction system 130 with the current geographic location of the mobile client system 110 to confirm whether the transaction system 130 and the mobile client system 110 are in geographic proximity of each other. If the two are in geographic proximity of each other, the process continues as described in step 208. Otherwise, the logic 122 may transmit a request for the local map stored on the storage device 136, which is presented to the mobile client system 110. The end user may be prompted to confirm that his current location is the same as that of the transaction system 130 using the map by selecting a corresponding I/O component 116.

Once the secure communication channel has been established, in one embodiment, if the end user has initiated the communication by selecting an option on the mobile client system 110 (step 202), in lieu of physically entering a debit or credit card into a port on the transaction system 130, the logic 122 may be configured to wirelessly transmit the end user's financial account information 126 stored in the storage device 118 to the transaction system 130. This transmission may occur automatically and absent any user input.

At step 208, a graphical user interface of the transaction system 130 is presented on the mobile client system 110 (e.g., on a display device corresponding to one of the I/O components 116). In one embodiment, the GUI 124 is stored on the mobile client system 110 and retrieved by the logic 122. Alternatively, the GUI 124 may be transmitted over the secure communication channel to the mobile client system 110 and presented thereon.

At step 210, the end user enters user credentials (e.g., user name and password combination) via the GUI 124 on the mobile client system 110 and corresponding I/O components 116. FIG. 3 illustrates a sample GUI on display screen 304. The user credentials are transmitted over the secure communication channel to the transaction system 130 at step 212. The transaction system 130 authenticates the user credentials and, if successful, provides the end user with the ability to enter transaction functions via the GUI 124 on the mobile client system 110 at step 214.

The mobile client system 110 transmits the transaction function data to the transaction system 130, which executes the transaction (e.g., transferring funds between accounts, purchasing goods or services, etc.) at step 216.

In an alternative embodiment, the transactions may be implemented using secure voice communications. In this embodiment, the I/O components 116 of the mobile client system 110 include a microphone and speakers for receiving voice commands by the end user. A secure voice channel is established similar to the secure communication channel described above. The end user may use voice commands or a combination of voice commands and button selections to input transaction data and authentication data.

Technical effects of the invention include in-vehicle, mobile transaction services. The mobile transaction services enable an end user to conduct wireless, secure in-vehicle electronic transactions at a transaction system that is geographically located in proximity of the end user. The mobile transaction service establishes a secure communication channel between the vehicle (or mobile device in the vehicle) and provides a graphical user interface that allows the end user to enter transaction data in the privacy of the vehicle and provides in-vehicle functions implemented using short-range communications.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the present application.

What is claimed is:

1. A mobile client system, comprising:
   a computer processor;
   a storage device; and
   logic executable by the computer processor, the logic configured to implement:
   storing transaction system-specific graphical user interfaces in the storage device of the mobile client system;
   in response to initiating a wireless communication with a transaction system, accessing, from the storage device, a graphical user interface from the transaction system-specific graphical user interfaces, the graphical user interface corresponding to the transaction system;
   receiving a digital certificate from the transaction system responsive to the initiating a wireless communication, the digital certificate including an embedded geographic location of the transaction system;
   determining, by the mobile client system via a global positioning system device, a current geographic location of the mobile client system;
   comparing, by the mobile client system, the geographic location of the transaction system with the current geographic location of the mobile client system;
   establishing an encrypted communication channel with the transaction system when, responsive to the comparing, it is determined that the location of the transaction system is in proximity of the current location of the mobile client system;
   requesting a local map from the transaction system when, responsive to the comparing, it is determined that the location of the transaction system is not proximally located to the current location of the mobile client system, the mobile client system prompted to confirm the current location based on the local map;
   sending user credentials to the transaction system via the encrypted communication channel; and
   upon successful authentication of the mobile client system via the user credentials, performing a transaction with the transaction system using the graphical user interface on the mobile client system that corresponds with the transaction system.

2. The mobile client system of claim 1, wherein the logic is further configured to implement:
   entering the user credentials into the graphical user interface;
   wherein the sending the user credentials is implemented via the graphical user interface.

3. The mobile client system of claim 1, wherein the logic is further configured to implement:
   storing financial account information in a secure digital certificate in a storage device of the mobile client system; and
   providing the financial account information to the transaction system, the financial account information identifying an account of a user of the mobile client system;
   wherein the financial account information is retrieved from the storage device and transmitted to the transaction system absent user input.

4. The mobile client system of claim 1, wherein the logic is further configured to implement:
   providing financial account information to the transaction system, the financial account information identifying an account of a user of the mobile client system;
   wherein the initiating the wireless communication is implemented in response to providing the financial account information.

5. The mobile client system of claim 1, wherein the logic is further configured to implement:
   selecting a designated option on the mobile client system;
   wherein the initiating the wireless communication is implemented in response to selecting the designated option.

6. The mobile client system of claim 1, wherein the performing a transaction is implemented using encrypted voice communications.

7. The mobile client system of claim 1, wherein the mobile client system is embedded in a vehicle.

8. The mobile client system of claim 1, wherein the mobile client system is at least one of a:
   smart phone;
   personal digital assistant; and
   tablet computer.

9. The system of claim 1, wherein the global positioning system device of the mobile client system is configured to determine the current location using deduced reckoning.

10. A method, comprising:
    storing, in a storage device of a mobile client system, transaction system-specific graphical user interfaces;
    in response to initiating, via the mobile client system, a wireless communication with a transaction system, accessing, from the storage device, a graphical user interface from the transaction system-specific graphical user interfaces, the graphical user interface corresponding to the transaction system;
    receiving a digital certificate from the transaction system responsive to the initiating a wireless communication, the digital certificate including an embedded geographic location of the transaction system;
    determining, by the mobile client system via a global positioning system device, a current geographic location of the mobile client system;

comparing, by the mobile client system, the geographic location of the transaction system with the current geographic location of the mobile client system;
establishing an encrypted communication channel with the transaction system when, responsive to the comparing, it is determined that the location of the transaction system is in proximity of the current location of the mobile client system;
requesting a local map from the transaction system when, responsive to the comparing, it is determined that the location of the transaction system is not proximally located to the current location of the mobile client system, the mobile client system prompted to confirm the current location based on the local map;
sending user credentials to the transaction system via the encrypted communication channel; and
upon successful authentication of the mobile client system via the user credentials, performing a transaction with the transaction system using the graphical user interface of the mobile client system that corresponds with the transaction system.

11. The method of claim 10, further comprising:
entering the user credentials into the graphical user interface;
wherein the sending the user credentials is implemented via the graphical user interface.

12. The method of claim 10, further comprising:
storing financial account information in a secure digital certificate in a storage device of the mobile client system;
providing the financial account information to the transaction system, the financial account information identifying an account of a user of the mobile client system;
wherein the user credentials are retrieved from the storage device and transmitted to the transaction system absent user input.

13. The method of claim 10, further comprising:
providing financial account information to the transaction system, the financial account information identifying an account of a user of the mobile client system;
wherein the initiating the wireless communication is implemented in response to providing the financial account information.

14. The method of claim 10, further comprising:
selecting a designated option on the mobile client system;
wherein the initiating the wireless communication is implemented in response to selecting the designated option.

15. The method of claim 10, wherein the mobile client system is embedded in a vehicle.

16. The method of claim 10, wherein the mobile client system is at least one of a:
smart phone;
personal digital assistant; and
tablet computer.

17. A computer program product comprising a non-transitory computer-readable storage medium having instructions embedded thereon, which when executed by a computer processor of a mobile client system cause the computer processor to implement:
storing transaction system-specific graphical user interfaces in the storage device of the mobile client system;
in response to initiating a wireless communication with a transaction system, accessing, from the storage device, a graphical user interface from the transaction system-specific graphical user interfaces, the graphical user interface corresponding to the transaction system;
receiving a digital certificate from the transaction system responsive to the initiating a wireless communication, the digital certificate including an embedded geographic location of the transaction system;
determining, by the mobile client system via a global positioning system device, a current geographic location of the mobile client system;
comparing, by the mobile client system, the geographic location of the transaction system with the current geographic location of the mobile client system;
establishing an encrypted communication channel with the transaction system when, responsive to the comparing, it is determined that the location of the transaction system is in proximity of the current location of the mobile client system;
requesting a local map from the transaction system when, responsive to the comparing, it is determined that the location of the transaction system is not proximally located to the current location of the mobile client system, the mobile client system prompted to confirm the current location based on the local map;
sending user credentials to the transaction system via the encrypted communication channel; and
upon successful authentication of the mobile client system via the user credentials, performing a transaction with the transaction system using the graphical user interface on the mobile client system that corresponds with the transaction system.

18. The computer program product of claim 17, wherein the instructions further include:
entering the user credentials into the graphical user interface;
wherein the sending the user credentials is implemented via the graphical user interface.

19. The computer program product of claim 17, wherein the instructions further include:
storing the user credentials in a secure digital certificate in a storage device of the mobile client system;
wherein the user credentials are retrieved from the storage device and transmitted to the transaction system absent user input.

20. The computer program product of claim 17, wherein the instructions further include:
storing financial account information in a secure digital certificate in a storage device of the mobile client system;
providing the financial account information to the transaction system, the financial account information identifying an account of a user of the mobile client system;
wherein the financial account information is retrieved from the storage device and transmitted to the transaction system absent user input.

* * * * *